United States Patent [19]
Prabhu et al.

[11] Patent Number: 5,922,794
[45] Date of Patent: Jul. 13, 1999

[54] COMPOSITIONS STABILIZED WITH TERTIARY AMINE OXIDES

[75] Inventors: Vaikunth S. Prabhu, Morgantown; Roger W. Avakian, Parkersburg, both of W. Va.

[73] Assignee: General Electric Company, Pittsfield, Mass.

[21] Appl. No.: 08/824,675

[22] Filed: Mar. 26, 1997

[51] Int. Cl.⁶ ........................................... C08K 5/17
[52] U.S. Cl. ..................... 524/236; 524/111; 524/130; 524/132
[58] Field of Search .................. 529/236, 111, 529/130, 132

[56] References Cited

U.S. PATENT DOCUMENTS

| | | | |
|---|---|---|---|
| H915 | 5/1991 | Gibbs | 521/25 |
| 3,275,449 | 9/1966 | Fritzberg | 99/80 |
| 3,279,924 | 10/1966 | Peebles | 99/56 |
| 3,803,111 | 4/1974 | Munro et al. | 260/89.5 S |
| 4,035,317 | 7/1977 | Gershberg | 260/2.5 N |
| 4,112,215 | 9/1978 | Boessler et al. | 528/503 |
| 4,171,296 | 10/1979 | Connelly et al. | 260/29.6 |
| 4,212,784 | 7/1980 | Philips et al. | 260/29.6 WQ |
| 4,506,062 | 3/1985 | Flescher et al. | 526/211 |
| 4,528,321 | 7/1985 | Allen et al. | 524/761 |
| 4,585,809 | 4/1986 | Auer et al. | 523/139 |
| 4,611,016 | 9/1986 | Hinsken et al. | 529/99 |
| 4,628,078 | 12/1986 | Glover et al. | 526/303.1 |
| 4,696,762 | 9/1987 | Sander et al. | 252/311 |
| 4,767,540 | 8/1988 | Spitzer et al. | 210/728 |
| 4,798,888 | 1/1989 | Symes et al. | 536/123 |
| 4,816,558 | 3/1989 | Rauch et al. | 528/501 |
| 4,835,206 | 5/1989 | Farrar et al. | 524/457 |
| 4,847,309 | 7/1989 | Klesse et al. | 523/139 |
| 4,892,932 | 1/1990 | Rauch et al. | 528/499 |
| 4,956,399 | 9/1990 | Kozakiewicz | 523/223 |
| 4,956,400 | 9/1990 | Kozakiewicz et al. | 523/223 |
| 5,025,004 | 6/1991 | Wu et al. | 514/165 |
| 5,037,881 | 8/1991 | Kozakiewicz et al. | 210/734 |
| 5,132,023 | 7/1992 | Kozakiewicz et al. | 210/734 |
| 5,167,766 | 12/1992 | Honig et al. | 162/164.1 |
| 5,171,781 | 12/1992 | Farrar et al. | 524/547 |
| 5,213,693 | 5/1993 | McGrow et al. | 210/728 |
| 5,268,114 | 12/1993 | Odorisio et al. | 252/51.5 A |
| 5,274,055 | 12/1993 | Honig et al. | 524/47 |
| 5,286,806 | 2/1994 | Neff et al. | 525/369 |

FOREIGN PATENT DOCUMENTS

| | | | |
|---|---|---|---|
| 0 277 018 A2 | of 0000 | European Pat. Off. | C10L 9/10 |
| 0 479 616 A 1 | of 0000 | European Pat. Off. | C02F 1/56 |
| 50-124979 | 3/1974 | Japan | C08F 20/56 |

OTHER PUBLICATIONS

Wolfgang Pietsch, Compactconsult, Inc., Chemical Engineering Progress, "Successfully Use Agglomeration for Size Enlargement," Apr. 1996 pp. 29–45.

Peter Koenig, Hosokawa Bepex Corp., Powder and Bulk Engineering, "Speeding up continous mixing agglomeration with fast agitation and short residence times," Feb. 1996 pp. 67–72, 74, 76, 78–80, 82,84.

*Primary Examiner*—Edward J. Cain

[57] ABSTRACT

Thermoplastic resin composition are provided that comprise a thermoplastic resin or mixture thereof, a stabilizing amount of a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydroxylamines, and the thiosynergists, and a stabilizing amount of a tertiary amine oxide. The compositions have improved stability against discoloration upon exposure to heating or to the combustion products of natural gas by the concomitant presence of an effective amount of a tertiary amine oxide.

19 Claims, No Drawings

5,922,794

COMPOSITIONS STABILIZED WITH TERTIARY AMINE OXIDES

FIELD OF THE INVENTION

The present invention pertains to resin compositions containing a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydroxylamines, and the thiosynergists, which are stabilized against degradation and/or discoloration by an effective amount of a tertiary amine oxide.

BACKGROUND OF THE INVENTION

Although various antioxidants have long been known to be effective stabilizers for polymeric resins and have enjoyed wide commercial success for that use, these same stabilized polymeric resin compositions continue to discolor upon heating at elevated temperatures for prolonged periods or upon exposure to the combustion products of natural gas.

While the addition of organic phosphites to such resin compositions stabilized with phenolic antioxidants tends to reduce the discoloration, it remains a serious practical problem.

Likewise polymeric resin compositions containing certain phenolic antioxidants and hindered amine stabilizers tend to discolor upon storage for extended periods even at ambient temperatures.

The organic hydroxylamine compounds, such as those found in U.S. Pat. Nos. 3,644,278 and 3,778,464, have also been used as antioxidant stabilizers for hydrocarbons including polyolefins. The use of the hydroxylamines in polyolefins in combination with a phenolic antioxidant or in combination with an organic phosphorus compound, an ultraviolet light absorber, a thiosynergist, or a hindered amine stabilizer with the resulting resistance to degradation and/or discoloration is disclosed in U.S. Pat. No. 4,590,231. Although such stabilized polyolefin compositions are improved, there continues to exist a need and desire to provide polymeric resin compositions which exhibit enhanced levels of stability and to provide alternate stabilizer compositions for incorporation into polymer compositions.

The tertiary amine oxides are widely used commercially as organic surfactants. Such surfactants have properties that make them very useful in shampoos, hair conditioners, dish and laundry detergents, fabric softeners and the like. The use of tertiary amine oxides until this time as stabilizer additives for polymeric resins, however, is believe to be novel, especially when used in combination with other additives.

DETAILED DESCRIPTION OF THE INVENTION

The broad object of the instant invention is to provide a polymeric resin composition stabilized against degradation, which contains an effective amount of a tertiary amine oxide and which also contains a stabilizer or mixture of stabilizers selected from the group consisting of the phenolic antioxidants, the 3-arylbenzofuranones, the hindered amine stabilizers, the ultraviolet light absorbers, the organic phosphorus compounds, the hydroxylamines, and the thiosynergists.

One object of the present invention is to provide a stabilized resin composition containing a phenolic antioxidant which is stabilized against discoloration upon exposure to heating or to the combustion products of natural gas by the concomitant presence of an effective amount of a tertiary amine oxide.

Another object of the present invention is to provide a stabilized polyolefin composition containing a phenolic antioxidant which is stabilized against discoloration upon exposure to heating or to the combustion products of natural gas by the concomitant presence of an effective amount of a tertiary amine oxide.

A further object of the instant invention is to provide a stabilized polyolefin composition containing a phenolic antioxidant and an organic phosphorus compound which is stabilized against discoloration upon exposure to heating or to the combustion products of natural gas by the concomitant presence of an effective amount of a tertiary amine oxide.

A further object of the instant invention is to provide a stabilized polyolefin composition containing a 3-arylbenzofuranone, which is stabilized against discoloration upon exposure to heating or to the combustion products of natural gas by the concomitant presence of an effective amount of a tertiary amine oxide.

Still another object of the present invention is to provide a stabilized polyolefin composition containing an alkaline metal salt of a fatty acid or said metal salt and a phenolic antioxidant which is stabilized against discoloration upon exposure to heating or to the combustion products of natural gas by the concomitant presence of an effective amount of a tertiary amine oxide.

Another object of the present invention is to provide a stabilized polyolefin composition containing an alkaline metal salt of a fatty acid or said metal salt, a hydroxylamine, and a phenolic antioxidant which is stabilized against discoloration upon exposure to heating or to the combustion products of natural gas by the concomitant presence of an effective amount of a tertiary amine oxide.

Another object of the present invention is to provide a stabilized polyolefin composition containing a phenolic antioxidant and a hindered amine stabilizer which is stabilized against discoloration upon exposure to heating, to the combustion products of natural gas or to storage for prolonged periods at ambient temperatures by the concomitant presence of an effective amount of a tertiary amine oxide.

Another object of the present invention is to provide a stabilized polyolefin composition containing a phenolic antioxidant and an ultraviolet light absorber which is stabilized against discoloration upon exposure to heating, to the combustion products of natural gas or to storage for prolonged periods at ambient temperatures by the concomitant presence of an effective amount of a tertiary amine oxide.

An object of the present invention is to provide a stabilized polyolefin composition containing a phenolic antioxidant, an ultraviolet light absorber and an organic phosphorus compound which is stabilized against discoloration upon exposure to heating or to the combustion products of natural gas by the concomitant presence of an effective amount of a tertiary amine oxide.

A further object of the instant invention is to provide a stabilized polyolefin composition containing a phenolic antioxidant, a hindered amine stabilizer and an organic phosphorus compound which is stabilized against discoloration upon exposure to heating or to the combustion products of natural gas by the concomitant presence of an effective amount of a tertiary amine oxide.

Still another object of the present invention is to provide a stabilized polyolefin composition containing a phenolic antioxidant, an ultraviolet light absorber and a hindered amine stabilizer which is stabilized against discoloration upon exposure to heating, to the combustion products of natural gas or to storage for prolonged periods at ambient temperatures by the concomitant presence of an effective amount of a tertiary amine oxide.

A further object of the instant invention is to provide a stabilized polyolefin composition containing a phenolic antioxidant, a hindered amine stabilizer, an organic phosphorus compound and a thiosynergist which is stabilized against discoloration upon exposure to heating or to the combustion products of natural gas by the concomitant presence of an effective amount of a tertiary amine oxide.

Still another object of the present invention is to provide a stabilized polyolefin composition containing a hindered amine stabilizer which is stabilized against discoloration upon exposure to heating, to the combustion products of natural gas, or to storage for prolonged periods at ambient temperatures by the concomitant presence of an effective amount of a tertiary amine oxide.

A further object of the instant invention is to provide a stabilized polyolefin composition containing a phenolic antioxidant, and a thiosynergist which is stabilized against discoloration upon exposure to heating or to the combustion products of natural gas by the concomitant presence of an effective amount of a tertiary amine oxide.

These and other objects will become apparent in the disclosure of the present invention.

DETAILED DISCLOSURE

This invention pertains to resin compositions, stabilized against degradation, which comprise:

(a) a thermoplastic resin or mixture thereof, (b) a stabilizing amount of a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydroxylamines, and the thiosynergists, and (c) a stabilizing amount of a tertiary amine oxide.

More particularly, the instant invention preferably pertains to stabilized compositions wherein component (a) is a polyolefin resin or mixture thereof.

The instant invention also preferably pertains to stabilized compositions wherein component (b) comprises:

1. a stabilizing amount of a phenolic antioxidant or mixture thereof; or 2. a stabilizing amount of a phenolic antioxidant or mixture thereof in combination with a stabilizing amount of a) an organic phosphorus compound or mixture thereof; or b) a hindered amine stabilizer or mixture thereof; or c) a thiosynergist or mixture thereof; or d) an ultraviolet light absorber or mixture thereof; or e) a hindered amine stabilizer and an organic phosphorus compound or mixtures thereof; or f) a hindered amine stabilizer, a thiosynergist and an organic phosphorus compound or mixtures thereof; or g) an ultraviolet light absorber and a hindered amine stabilizer or mixtures thereof; or h) an ultraviolet light absorber and an organic phosphorus compound or mixtures thereof; or i) an alkaline metal salt of a fatty acid or mixture thereof; or j) a hydroxyl amine or mixture thereof; or 3. a stabilizing amount of a hindered amine stabilizer or mixture thereof; or 4. a stabilizing amount of an alkaline metal salt of a fatty acid or mixture thereof; or 5. a stabilizing amount of a 3-arylbenzofuranone. Other combinations are also envisioned in the present invention.

The amine oxide is preferably a tertiary amine oxide as represented by general formula (I):

wherein $R^1$ and $R^2$ are independently each a $C_6$ to $C_{36}$ residue that may optionally contain at least one —O—, —S—, —SO—, —CO$_2$—, —CO—, or —CON— moiety; and $R^3$ is a $C_1$ to $C_{36}$ residue that may also optionally and independently contain at least one —O—, —S—, —SO—, —CO$_2$—, —CO—, or —CON— moiety. Included in the residues for $R^1$, $R^2$, and $R^3$ are benzyl and substituted benzyl residues. It is also possible for each of $R^1$, $R^2$, and $R^3$ to be the same residue. $R^1$ and $R^2$ are preferably $C_8$ to $C_{26}$ residues and most preferably $C_{10}$ to $C_{26}$ residues and $R^3$ is preferably $C_1$ to $C_{22}$ residues and most preferably a $C_1$ residue (e.g., methyl). Also, preferred amine oxides include those wherein $R^1$, $R^2$, and $R^3$ are the same $C_6$ to $C_{36}$ residues. Preferably, all of the aforementioned residues for $R^1$, $R^2$, and $R^3$ are saturated hydrocarbon residues or saturated hydrocarbon residues containing at least one of the aforementioned —O—, —S—, —SO—, —CO$_2$—, —CO—, or —CON— moieties. Those skilled in the art will be able to envision other useful residues for each of $R^1$, $R^2$, and $R^3$ without detracting from the present invention.

The amine oxide of the present invention also includes poly(amine oxides). By poly(amine oxide) is meant tertiary amine oxides containing at least two tertiary amine oxides per molecule. Illustrative poly(amine oxides) (also called "poly(tertiary amine oxides)") include the tertiary amine oxide analogues of aliphatic and alicyclic diamines such as, for example, 1,4-diaminobutane; 1,6-diaminohexane; 1,10-diaminodecane; and 1,4-diaminocyclohexane, and aromatic based diamines such as, for example, diamino anthraquinones and diaminoanisoles. Also included are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. Generally a useful number of amine oxide moieties in the overall thermoplastic resin is between about 0.001 weight percent and about 5 weight percent, based on the weight of the entire thermoplastic composition. All of the aforementioned amine oxides may optionally contain at least one —O—, —S—, —SO—, —CO$_2$—, —CO—, or —CON— moiety. In a preferred embodiment, each tertiary amine oxide of the polymeric tertiary amine oxide contains a $C_1$ residue.

In a preferred embodiment of the present invention, the amine oxide is attached to a molecule containing a hindered amine. Hindered amines are known in the art and the amine oxide of the present invention may be attached to the hindered amine in any manner and structural position of the hindered amine. Useful hindered amines in the present invention include those of the general formulas (II) and (III):

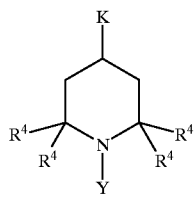

(II)

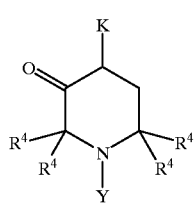

(III)

wherein K is a carbon chain containing the amine oxide (or amine oxides), Y is a $C_{1-30}$ alkyl moiety, a —C(O)R moiety wherein R is a $C_{1-30}$ alkyl group, or a —OR moiety wherein R is a C1-30 alkyl group, and each $R^4$ is independently a $C_{1-30}$ alkyl group, preferably a methyl group. Also included are amine oxides containing more than one hindered amine and more than one amine oxide per molecule. The hindered amine may be attached to a poly(tertiary amine oxide) or attached to a polymeric substrate, as discussed above.

Amine oxides and processes for making thereof are set out in Richard J. Nadolsky Amine Oxides Encyclopedia of Chemical Technology, Vol. 2, pages 259–271, John Wiley & Sons, Inc. (1978), which is incorporated herein by reference.

Also included in the present invention are thermal reaction products of tertiary amine oxides. Under elevated temperatures, e.g., such as those useful to prepare the thermoplastic compositions of the present invention, amine oxides including those illustrated by Formula I are believed to undergo various reactions. Some of these reactions are believed to result in the formation of various thermal reaction products, for example, hydroxyl amines and olefinic species. Although the mechanism for the stabilization of various resins with the tertiary amine oxides is presently unknown, it is believed that various reactive intermediates along the reaction pathways may play a role in the stabilization effect.

Amine oxide reaction products containing at least one long chain carbon residue are preferred in order to increase the solubility of the reaction products, including the hydroxyl amine-type reaction products, with the thermoplastic resin. When only a single alkyl substituent (i.e., only one of $R^1$, $R^2$, and $R^3$) in the tertiary amine oxide is a $C_6$ to $C_{36}$ residue and the other two alkyl substituents are $C_{1-5}$ residues, some of the hydroxyl amine-type reaction products are believed to contain only short chain substituents (i.e., $C_{1-5}$ residues). It is believed that this is a result of some of the long chain residues being eliminated from the amine oxide as an olefinic by-product. In order to insure that at least one long chain is retained in the hydroxyl amine-type thermal reaction products, either all three substituents should preferably be long chain or one chain can be $C_1$ (e.g., methyl) and the other two substituents be long chain (e.g., $C_6$ to $C_{36}$ residues). When one substituent is a $C_1$ residue and the other two substituents are long chain residues (including polymeric residues as previously described), the resultant thermal reaction product will be asymmetrical and contain a $C_1$ residue and a long chain residue. By long chain carbon residue is meant from $C_6$ to about $C_{36}$, preferably from $C_8$ to $C_{26}$ and most preferably $C_{10}$ to $C_{22}$. Also included by long chain residue are the before mentioned polymeric amine oxide residues. The long chain carbon residue may also optionally contain at least one of the before mentioned —O—, —S—, —SO—, —CO$_2$—, —CO—, or —CON— moieties described for $R^1$, $R^2$, and $R^3$. Hydroxyl amines-type reaction products that do not contain the aforementioned long chain residue tend to migrate out of the thermoplastic resin and can bloom to the surface of the thermoplastic resin or coat the surface of the processing equipment requiring costly downtime for cleaning and maintenance. It should be clear from the foregoing that the present invention includes hydroxyl amines containing at least one long chain carbon residue, preferably asymmetrical hydroxyl amines containing a long chain and a short chain; and also include polymeric hydroxyl amines containing at least two hydroxyl amines per molecule.

Especially preferred amine oxides for use in the present invention are saturated amine oxides and include dioctyl methyl amine oxide, trioctyl amine oxide, didecyl methyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri ($C_{20}$–$C_{22}$) amine oxide, and di($C_{20}$–$C_{22}$ alkyl) methyl amine oxide. Especially preferred hydroxyl amines are saturated hydroxyl amines and include octyl methyl hydroxyl amine, decyl methyl hydroxyl amine, (coco alkyl) methyl hydroxyl amine, (tallow alkyl) methyl hydroxyl amine, and ($C_{20}$–$C_{22}$ alkyl) methyl hydroxyl amine. By the term "coco alkyl" is meant hydrogenated $C_{12}$–$C_{14}$ alkyl commonly referred to as hydrogenated coconut oil. By the term "tallow alkyl" is meant hydrogenated $C_{16}$–$C_{18}$ alkyl commonly referred to as hydrogenated tallow oil. Hydrogenated tallow oil is described in U.S. Pat. No. 4,876,300. The aforementioned hydrogenated coconut oil and hydrogenated tallow oil do contain some percentage of higher and/or lower carbon chain lengths than are described above and it should be understood that these other fractions are within the scope of the present invention. It is preferred that at least 75% of the carbon chains be within the described ranges for the coconut oil and tallow oil.

The amine oxide and any reaction products thereof are preferably present in an amount effective to improve the melt stability and/or the yellowness index of a thermoplastic composition. The amount is generally less than about 5 weight percent based on the weight of the thermoplastic resin, preferably less than about 1000 ppm based on the weight of the thermoplastic resin, and is even more preferably between about 950 ppm and about 5 ppm based on the weight of the thermoplastic resin.

It should be clear that the present invention includes a thermoplastic resin composition comprising a thermoplastic resin, and an amine oxide present at a level of from 0.001 to 5 percent by weight, based on the total weight of the composition, wherein the amine oxide has the structural formula (I):

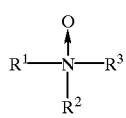

(I)

wherein $R^1$, $R^2$, and $R^3$ are independently selected from alkyl, aryl, aralkyl, alkaryl, cycloalkyl, alkcycloalkyl and cycloalkalkyl and each have from 1 to 36 carbon atoms per group, provided that if one of $R^1$, $R^2$, and $R^3$ is an alkyl group having from 6 to 36 carbon atoms per group, then the other two of $R^1$, $R^2$, and $R^3$ cannot both be alkyl groups having from 1 to 5 carbon atoms per group. It should also be clear that the present invention includes a method for stabilizing a thermoplastic resin, said method comprising: admixing an amine oxide with the thermoplastic resin, said amine oxide having the structural formula (I):

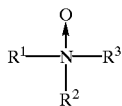

(I)

wherein $R^1$, $R^2$, and $R^3$ are independently selected from alkyl, aryl, aralkyl, alkaryl, cycloalkyl, alkcycloalkyl and cycloalkalkyl and each have from 1 to 36 carbon atoms per group, provided that if one of $R^1$, $R^2$, and $R^3$ is an alkyl group having from 6 to 36 carbon atoms per group, then the other two of $R^1$, $R^2$, and $R^3$ cannot both be alkyl groups having from 1 to 5 carbon atoms per group.

The thermoplastic resin, also referred to as a polymer, may be any thermoplastic known in the art, such as polyesters, polyurethanes, polyalkylene terephthalates, polyketones, polysulfones, polyimides, polyphenylene ethers, styrenic polymers, polycarbonates, acrylic polymers, polyamides, polyacetals, halide containing polymers and polyolefin homopolymers and copolymers. Mixtures of different polymers, such as polyphenylene ether/styrenic resin blends, polyvinyl chloride/ABS or other impact modified polymers, such as methacrylonitrile and α-methylstyrene containing ABS, and polyester/ABS or polycarbonate/ABS and polyester plus some other impact modifier may also be used. Such polymers are available commercially or may be made by means well known in the art. However, the hydrocarbon amine oxides and stabilizer compositions of the invention are particularly useful in thermoplastic polymers, such as polyolefins, polycarbonates, polyesters, polyphenylene ethers and styrenic polymers, due to the extreme temperatures at which thermoplastic polymers are often processed and/or used.

Polymers of monoolefins and diolefins, for example polypropylene, polyisobutylene, polybutene-1, polymethylpentene-1, polyisoprene, or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefines with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene propylene-copolymers, LDPE/EVA, LDPE/EAA, LLDPE/EVA, and LLDPE/EAA.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methylacrylate, mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene styrene. Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene-propylene-diene terpolymers, styrene and acrylonitrile on polyacrylates or polymethacrylates, styrene and acrylonitrile on acrylate/butadiene copolymers, as well as mixtures thereof with the styrenic copolymers indicated above.

Nitrile polymers are also useful in the polymer composition of the invention. These include homopolymers and copolymers of acrylonitrile and its analogs, such as polymethacrylonitrile, polyacrylonitrile, acrylonitrile/butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homo- and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymers, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally platicized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4dimethylol-cyclohexane terephthalate, poly-2(2,2,4(4-hydroxyphenyl)-propane) terephthalate and polyhydroxybenzoates as well as block copolyetheresters derived from polyethers having hydroxyl end groups.

Polyamides and copolyamides which are derived from bisamines and dicarboxylic acids and/or from aminocarboxylic acids or the corresponding lactams, such as polyamide, 4,polyamide 6,polyamide 6/6, 6/10, 6/9, 6/12 and 4/6, polyamide 11, polyamide 12, aromatic polyamides obtained by condensation of m-xylene bisamine and adipic acid; polyamides prepared from hexamethylene bisamine and isophthalic or/and terephthalic acid and optionally an elastomer as modifier, for example poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

Polyolefin, polyalkylene terephthalate, polyphenylene ether and styrenic resins, and mixtures thereof are more preferred, with polyethylene, polypropylene, polyethylene terephthalate, polyphenylene ether homopolymers and copolymers, polystyrene, high impact polystyrene, polycarbonates and ABS-type graft copolymers and mixtures thereof being particularly preferred.

The present compositions also contain a stabilizing amount of a stabilizer or mixture of stabilizers selected from the group consisting of the phenolic antioxidants, the hindered amine stabilizers, the ultraviolet light absorbers, the organic phosphorus compounds, the alkaline metal salts of fatty acids, the hydroxyl amines, and the thiosynergists.

The phenolic antioxidants useful in the instant compositions embrace a large family of compounds examples of which are given below.

Simple 2,6-dialkylphenol, such as, for example, 2,6-di-tert.-butyl-4-methylphenol, 2-tert.-butyl-4,6-di-methylphenol, 2,6-di-tert.-butyl-4-methoxymethylphenol 2,6-dioctadecyl-4-methylphenol and 2,6-di-tert-butylphenol. Vitamin E and derivatives of vitamin E are also useful phenolic antioxidants.

Derivatives of alkylated hydroquinones, such as for example, 2,5-di-tert.-butyl-hydroquinone, 2,5-di-tert.-amylhydroquinone, 2,6-di-tert.-butyl-hydroquinone, 2,5-di-tert.-butyl-4-hydroxy-anisole, 3,5-di-tert.-butyl4-hydroxy-anisole, tris-(3,5-di-tert.-butyl4-hydroxyphenyl) phosphite, 3,5-di-tert.-butyl4-hydroxyphenyl stearate and bis-(3,5-di-tert-butyl-4-hydroxyphenyl) adipate.

Hydroxylated thiodiphenyl ethers, such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl) disulfide.

Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butylphenol), 2,6-di(3,-tert.-butyl-5-methyl-2-hydroxybenzyl)-4-methylphenol, 2,2'-methylene-bis-[4-methyl-6-( alpha -methylcyclohexyl)-phenol], 1,1-bis(3,5-dimethyl-2-hydroxyphenyl)-butane, 1,1-bis-(5-tert.-butyl-4-hydroxy-2-methylphenyl)-butane, 2,2-bis-(3,5-di-tert.-butyl4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercaptobutane, 1,1,5,5-tetra-(5-tert.-butyl-4-hydroxy-2-methylphenyl)-pentane and ethylene glycol bis-[3,3-bis-(3-tert.-butyl-4-hydroxyphenyl)-butyrate].

O—, N— and S-benzyl compounds, such as, for example, 3,5,3',5'-tetra-tert.-butyl-4,4'-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.-butyl-3-hydroxy-2,6-dimethylbenzyl) dithioterephthalate.

Hydroxybenzylated malonates, such as for example, dioctadecyl 2,2-bis-(3,5-di-tert.-butyl-2-hydroxybenzyl)-malonate, dioctadecyl 2-(3-tert.-butyl-4-hydroxy-5-methylbenzyl)-malonate, di-dodecylmercapto-ethyl 2,2-bis-(3,5-di-tert.-butyl4-hydroxybenzyl)-malonate and di-[4-(1,1,3,3-tetramethylbutyl)-phenyl]2,2-bis-(3,5-di-tert.-butyl-4-hydroxybenzyl)-malonate.

Hydroxybenzyl-aromatic compounds, such as, for example, 1,3,5-tri-(3,5-di-tert.-butyl-4-hydroxybenzyl)-2,4,6-trimethylbenzene, 1,4-di-(3,5-di-tert-butyl-4-hydroxybenzyl)-2,3,5,6-tetramethylbenzene and 2,4,6-tri(3,5-di-tert.-butyl-4-hydroxybenzyl)-phenol.

s-Triazine compounds, such as, for example, 2,4-bisoctylmercapto-6-(3,5-di-tert.-butyl-hydroxl-anilino)-s-triazine, 2-octylmercapto,4,6-bis-(3,5-di-tert.-butyl-4-hydroxy anilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert-butyl-4-hydroxyphenylethyl)-s-triazine, 1,3,5-tris-(2,6-di-methyl-3-hydroxy-4-tert-butylbenzyl)isocyanurate and 1,3-5-tris-(3,5-di-tert.-butyl-4-hydroxybenzyl)isocyanurate.

Amides of beta-(3,5-di-tert.-butyl-4-hydroxyphenyl)-propionic acid, such as, for example, 1,3,5-tris-(3,5-di-tert.-butyl-4-hydroxyphenyl-propionyl)-hexahydro-s-triazine and N,N'-di(3,5-di-tert.-butyl-4-hydroxyphenyl-propionyl)-hexamethylenediamine. N,N'-bis-beta-(3,5-di-t-butyl-4-hydroxyphenyl)-propionylhydrazine.

Esters of beta-(3,5-di-tert.-butyl-4-hydroxyphenyl)-propionic acid with monohydric or polyhydric alcohols, such as, for example with methanol, ethanol, octadecanol, 1,6-hexanediol, 1,9-nonanediol, ethylene glycol, 1,2-propanediol, diethylene glycol, thiodiethylene glycol, triethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2.2.2]octane.

Esters of beta-(5-tert.-butyl-4-hydroxyl-3-methylphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, triethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2]-octane.

Esters of 3,5-di-tert.-butyl-4-hydroxyphenylacetic acid with monohydric or polyhydric alcohols, such as for example, with methanol, ethanol, octadecanol, 1,6-hexandiol, 1,9-nonanediol, ethylene glycol, 1,2-propenediol, diethylene glycol, thio-diethylene glycol, neopentylglycol, pentaerythritol, 3-thia-undecanol, 3-thia-pentadecanol, trimethylhexanediol trimethylolethane, trimethylolpropane, tris-hydroxyethyl isocyanurate and 4-hydroxymethyl-1-phospha-2,6,7-trioxabicyclo[2.2.2]-octane, especially the tetrakis ester of pentaerythritol.

Benzylphosphonates, such as, for example, dimethyl 3,5-di-tert.-butyl-4-hydroxybenzylphosphonate, diethyl 3,5-di-tert.-butyl-4-hydroxybenzylphosphonate, dioctadecyl 3,5-di-tert.-butyl-4-hydroxybenzylphosphonate and dioctadecyl-5-tert.-butyl-4-hydroxy-3-methylbenzylphosphonate.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl- 4-hydroxybenzyl)-isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl) benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl4-tert-butyl-3-hydroxybenzyl)isocyanurate, 1,1,3-tris(2-methyl-4-hydroxy-5-tert-butylphenyl)butane, 1,3,5-tris[2-(3,5-di-tert-butyl-4-hydroxyhydrocinnamoyloxy) ethyl]isocyanurate, 3,5-di-(3,5-di-tert-butyl-4-hydroxybenzyl)mesitol, hexamethylene bis(3,5-di-tert-butyl-4-hyroxyhydrocinnamate), 1-(3,5-di-tert-butyl4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis-[2-(3,5-di-tert-butyl-4-hydroxyhydrocinnamoyloxy)ethyl]-oxamide.

A most preferred embodiment has as the phenolic antioxidant, neopentanetetrayl tetrakis(3,5-di-tert-butyl-4-hydroxyhydrocinnamate), n-octadecyl 3,5-di-tert-butyl4-hydroxyhydrocinnamate, 1,3,5-trimethyl-2,4,6-tris(3,5-di-tert-butyl4-hydroxybenzyl)benzene, 1,3,5-tris(3,5-di-tert-butyl-4-hydroxybenzyl)isocyanurate, 2,6-di-tert-butyl-p-cresol or 2,2'-ethylidene-bis(4,6-di-tert-butylphenol).

When the present composition contain a stabilizing amount of a 3-arylbenzofuranone, the 3-arylbenzofuranone is of the formula

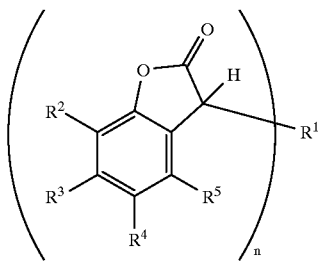

wherein, when n is 1, $R^1$ is an unsubstituted or substituted carbocyclic or heterocyclic aromatic ring system, wherein, when n is 2, $R^1$ is unsubstituted or $C_1$–$C_4$alkyl- or hydroxy-substituted phenylene or naphthylene; or is —$R^6$—X—$R^7$—, and wherein $R^2$, $R^3$, $R^4$ and $R^5$ are each independently of one another hydrogen, chloro, hydroxy, $C_1$–$C_{25}$alkyl, $C_7$–$C_9$-phenylalkyl, unsubstituted or $C_1$–$C_4$alkyl-substituted phenyl, unsubstituted or $C_1$–$C_4$alkyl-substituted $C_5$–$C_8$cycloalkyl; $C1$–$C_{18}$alkoxy, $C_1$–$C_{18}$alkylthio, $C_1$–$C_4$alkylamino, di-($C_1$–$C_4$alkyl)amino, $C1$–$C_{25}$alkanoyloxy, $C_1$–$C_{25}$alkanoylamino, $C_3$–$C_{25}$alkenoyloxy, $C_3$–$C_{25}$alkanoyloxy which is interrupted by oxygen, sulfur or >N-$R^8$; $C_6$–$C_9$cycloalkylcarbonyloxy, benzoyloxy or $C_1$–$C_{12}$alkyl-substituted benzoyloxy; or each pair of substituents $R^2$ and $R^3$ or $R^3$ and $R^4$ or $R^4$ and $R^5$, together with the linking carbon atoms, forms a benzene ring; $R^4$ is additionally —$(CH_2)_p$—$COR^9$ or —$(CH_2)_q$OH, or, if $R^3$ and $R^5$ are hydrogen, $R^4$ is additionally a radical of formula

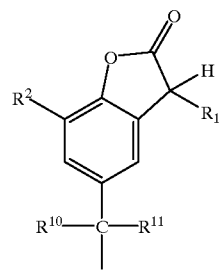

wherein $R^1$ is as defined above when n=1, $R^6$ and $R^7$ are each independently of the other unsubstituted or $C_1$–$C_4$alkyl-substituted phenylene or naphthylene, $R^8$ is hydrogen or $C_1$–$C_8$alkyl, $R^9$ is hydroxy, (—O⁻1/r M$^{r+}$); $C_1$–$C_{18}$ alkoxy or

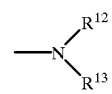

$R^{10}$ and $R^{11}$ are each independently of the other hydrogen, $CF_3$, $C_1$–$C_{12}$alkyl or phenyl, or $R^{10}$ and $R^{11}$, together with the linking carbon atom, form a $C_5$–$C_8$cycloalkylidene ring which is unsubstituted or substituted by 1 to 3 $C_1$–$C_4$alkyl groups, $R^{14}$ is hydrogen or $C_1$–$C_{18}$alkyl, M is a metal cation of valency r, X is a direct bond, oxygen, sulfur or $NR^{14}$, n is 1 or 2, p is 0, 1 or 2, q is 1, 2,3,4,5 or 6, and r is 1, 2 or 3, which process comprises reacting a compound of formula

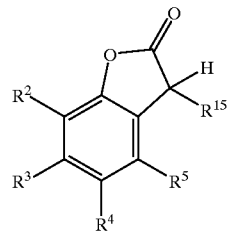

wherein $R^{15}$ is halogen or —$OR'^{15}$, $R'^{15}$ is hydrogen, $C_1$–$C_{25}$alkanoyl, $C_3$–$C_{25}$alkenoyl, $C_3$–$C_{25}$alkanoyl which is interrupted by oxygen, sulfur or

$C_6$–$C_9$cycloalkylcarbonyl, thenoyl, furoyl, benzoyl or $C_1$–$C_{12}$alkyl-substituted benzoyl; naphthoyl or $C_1$–$C_{12}$alkyl-substituted naphthoyl; $C_1$–$C_{25}$alkanesulfonyl, fluoro-substituted $C_1$–$C_{25}$alkanesulfonyl; phenylsulfonyl or $C_1$–$C_{12}$alkyl-substituted phenylsulfonyl;

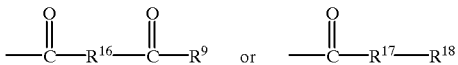

$R^{16}$ is a direct bond, $C_1$–$C_{18}$alkylene, $C_2$–$C_{18}$alkylene which is interrupted by oxygen, sulfur or

$C_2$–$C_{18}$alkenylene, $C_2$–$C_{20}$alkylidene, $C_7$–$C_{20}$phenylalkylidene, $C_5$–$C_8$cycloalkylene, $C_7$–$C_8$bicycloalkylene, unsubstituted or $C_1$–$C_4$alkyl-substituted phenylene,

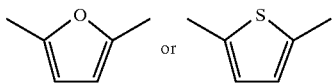

$R^{17}$ is oxygen, —NH— or

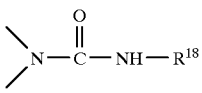

and $R^{18}$ is $C_1$–$C_{18}$alkyl or phenyl, with a compound of formula

Useful 3-arylbenzofuranones are known compounds and include those found in U.S. Pat. Nos. 4,325,863; 4,338,244, 5,175,312, and 5,607,624.

An especially preferred 3-arylbenzofuranone for use in the present invention is 5,7-di-tert-butyl-3-(3,4-dimethylphenyl)-3H-benzofuran-2-one.

When the instant compositions contain an organic phosphorus compound, such compounds may be, for example, triphenyl phosphite, diphenylalkyl phosphites, phenyldialkyl phosphites, tri-(nonylphenyl) phosphite, trilauryl phosphite, trioctadecyl phosphite, di(isodecyloxy)-2,4,8,10-tetraoxa-3,9-diphospha-[5.5]-undecane, and tri-(4-hydroxy-3,5-di-tert.butylphenyl) phosphite, and/or similar phosphonites.

The organic phosphorus compounds of particular interest include those selected from the group consisting of tris(2,4-di-tert-butylphenyl) phosphite, 3,9-di(2,4-di-tert-butylphenoxy)-2,4,8,10-tetraoxa-3,9-diphospha[5.5]undecane, tris(p-nonylphenyl) phosphite, 3,9-distearyloxy-2,4,8,10-tetraoxa-3,9-diphospha[5.5]undecane, dilauryl phosphite, 3,9-di[2,6-di-tert-butyl-4-(2-(n-octadecyloxycarbonyl)ethyl)-phenoxy]-2,-4,8,10-tetraoxa-3,9-diphospha[5.5]undecane and tetrakis(2,- 4-di-tert-butylphenyl) 4,4'-bis(diphenylene)phosphonite, distearyl pentaerythritol diphosphite, diisodecyl pentaerythritol diphosphite, 2,4,6-tri-tert-butylphenyl-2-butyl-2-ethyl-1,3-propanediol phosphite, bis(2,4-di-tert-butylphenyl) pentaerythritol diphosphite, tristearyl sorbitol triphosphite, and tetrakis(2,4-di-tert-butylphenyl)4,4'-biphenylene diphosphonite. Tris(2,4-di-tert-butylphenyl) phosphite, 2,4,6-tri-tert-butylphenyl-2-butyl-2-ethyl-1,3-propanediol phosphite, bis(2,4-di-tert-butylphenyl)pentaerythritol diphosphite are especially preferred, as well as mixtures of phosphites containing at least one of the foregoing phosphites.

When the instant compositions contain a thiosynergist, such thiosynergists may be for example dilauryl thiodipropionate, distearyl thiodipropionate or neopentanetetrayl tetrakis(3-dodecylthiopropionate). Distearyl thiodipropionate or dilauryl thiodipropionate is particularly preferred.

When the instant compositions contain an alkaline metal salt of a fatty acid, such salts are the alkali metal, alkaline earth metal, zinc, cadmium or aluminum salts of the higher fatty acids for example calcium stearate, zinc stearate, magnesium behenate, sodium ricinoleate, or potassium palmitate. Calcium stearate is particularly preferred.

When the instant compositions contain a hindered amine stabilizer, such hindered amines may for example be 4-benzoyl-2,2,6,6-tetramethylpiperidine, 4-stearyloxy-2,2-6,6-tetramethylpiperidine, bis-(2,2,6,6-tetramethylpiperidyl)sebacate, or 3-n-octyl-7,7,9,9-tetramethyl-1,3,-8-triaza-spiro[4.5]decane-2,4-dione. Amine oxides of hindered amine stabilizers are also included in the present invention.

The hindered amine stabilizers of particular interest are selected from the group consisting of bis(2,2,-6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)-butylmalonate, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2] heneicosane, polycondensation product of 2,4-dichloro-6-tert-octylamino-s-triazine and 4,4'-hexamethylenebis (amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis(amino-2,2,6-6-tetramethylpiperidine) and 1,2-dibromoethane, polycondensation product of 2,4-dichloro-6-morpholino-s-triazine and 4,4'-hexamethylenebis(amino-2,2,6,6-tetramethylpiperidine), N,N'N",N"'-tetrakis[(4,6-bis(butyl-(2,2,6,6-tetramethylpiperidin-4-yl)-amino-s-triazin-2-yl]-1,1 0-diamino-4,7-diazadecane, octamethylene bis(2,2,6,6-tetramethylpiperidin-4-carboxylate), and 4,4'-ethylenebis-(2,2,6,6-tetramethylpiperazin-3-one).

A most preferred embodiment has as the hindered amine stabilizer bis(2,2,6,6-tetramethylpiperidin-4-yl) sebacate, the polycondensation product of 1-(2-hydroxyethyl)-2,2,6, 6-tetramethyl-4-hydroxypiperidine and succinic acid, the polycondensation product of 2,4-dichloro-6-tert-octylamino-s-triazine and 4,4'-hexamethylenebis(amino-2, 2-6,6-tetramethylpiperidine), or N,N',N",N"'-tetrakis[(4,6-bis(butyl-(2,2,6,6-tetramethyl-piperidin-4-yl)amino)-s-triazine-2-yl]-1,10-diamino-4,7-diazadecane, as well as mixtures of amine stabilizers containing at least one of the foregoing.

When the instant compositions contain an ultraviolet light absorber, such light absorbers may include the 2H-benzotriazoles, the benzophenones, the oxanilides, the alpha-cyanocinnamates the substituted benzoate esters or the nickel salts of the O-alkyl hindered phenolic benzylphosphonates.

Examples of such ultraviolet light absorbers are seen below.

2-(2'-Hydroxyphenyl)-benzotriazoles, e.g., the 5'-methyl-, 3',5'-di-tert.-butyl-, 5'-tert.-butyl-, 5'-(1,1,3,3-tetramethylbutyl)-, 5-chloro-3',5'-di-tert.-butyl-5-chloro-3'-tert.-butyl-5'-methyl-, 3'-sec.-butyl-5'-tert.-butyl-, 3'- alpha -methylbenzyl -5'-methyl, 3'- alpha-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl- and 5-chloro-3',5'-di-tert.-amyl-derivative.

2,4-bis-(2'-Hydroxyphenyl)-6-alkyl-s-triazines, e.g., the 6-ethyl-, 6-heptadecyl- or 6-undecyl-derivative.

2-Hydroxybenzophenones e.g., the 4-hydroxy-, 4-methoxy-, 4-octoxy-, 4-decyloxy-, 4-dodecyloxy-, 4-benzyloxy-, 4,2',4'-trihydroxy-, 2,2',4,4'-tetrahydroxy- or 2'-hydroxy-4,4'-dimethoxy-derivative.

1,3-bis-(2'-Hydroxybenzoyl)-benzenes, e.g., 1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy4'-dodecyloxybenzoyl)-benzene.

Esters of optionally substituted benzoic acids, e.g., phenylsalicylate octylphenylsalicylate, dibenzoylresorcin, bis-(4-tert.-butylbenzoyl)-resorcin, benzoylresorcin, 3,5-di-tert.-butyl-4-hydroxybenzoic acid-2,4-di-tert.-butylphenyl ester or -octadecyl ester or -2-methyl-4,6-di-tert.-butyl ester.

Acrylates, e.g., alpha -cyano- beta, beta -diphenylacrylic acid-ethyl ester or isooctyl ester, alpha -carbomethoxy-cinnamic acid methyl ester, alpha -cyano-beta -methyl-p-methoxy-cinnamic acid methyl ester or -butyl ester or N( beta-carbomethoxyvinyl)-2-methyl-indoline.

Oxalic acid diamides, e.g., 4,4'-di-octyloxy-oxanilide, 2,2'-di-octyloxy-5,5'-di-tert.-butyl-oxanilide, 2,2'-didodecyloxy-5,5'-di-tert.-butyl-oxanilide, 2-ethoxy-2'-ethyl-oxanilide, N,N'-bis-(3-dimethyl-aminopropyl)-oxalamide, 2-ethoxy-5-tert.-butyl-2'-ethyloxanilide and the mixture thereof with 2-ethoxy-2'-ethyl-5,4'-di-tert.-butyl-oxanilide, or mixtures of orlho- and para-methoxy- as well as of o- and p-ethoxy-disubstituted oxanilides.

Preferably the ultraviolet light absorber used in the instant compositions is 2-(2-hydroxy-5-methylphenyl)-2H-benzotriazole, 2-(2-hydroxy-3,5-di-tert-amylphenyl)-2H-benzotriazole, 2-[2-hydroxy-3,5-di-(alpha,alpha-dimethylbenzyl)phenyl]-2H-benzotriazole, 2-(2-hydroxy-5-tert-octylphenyl)-2H-benzotriazole, 2-hydroxy-4-octyloxybenzophenone, nickel bis(O-ethyl 3,5-di-tert-butyl-4-hydroxybenzylphosphonate), 2,4-dihydroxybenzophenone, 2-(2-hydroxy-3-tert-butyl-5-methylphenyl)-2H-benzotriazole, nickel butylamine complex with 2,2'-thiobis(4-tert-butylphenol), 2-ethoxy-2'-ethyloxanilide or 2-ethoxy-2'-ethyl-5,5'-ditert-butyloxanilide.

When the instant compositions contain a hydroxylamine, such hydroxylamines include, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dioctylhydroxylamine, N,N-di-tert-butylhydroxylamine, N-cyclohexylhydroxylamine, N-cyclododecylhydroxylamine, N,N-dicyclohexylhydroxylamine, N,N-dibenzylhydroxylamine, N,N-didecylhydroxylamine, N,N-di(coco alkyl)hydroxylamine, N,N-di($C_{20}$–$C_{22}$ alkyl)hydroxylamine, and N,N-dialkylhydroxylamine derived from hydrogenated tallow amine (i.e., N,N-di(tallow alkyl)hydroxylamine), as well as mixtures containing any of the foregoing. Other useful hydroxylamines are known in the art such as these in U.S. Pat. Nos. 3,644,278; 3,778,464; and 4,590,231.

The stabilized polyolefin compositions of the instant invention may also contain other additives such as the pigments, colorants or dyes, light stabilizers such as metal deactivators, talc and other fillers, etc.

The stabilizer combinations of this invention stabilize polymeric resins especially during high temperature processing with relatively little change in color, even though the polymer may undergo a number of extrusions.

The instant stabilizers may readily be incorporated into the polymeric resins by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The stabilized polyolefin compositions of the invention may optionally also contain from about 0.01 to about 5%, preferably from about 0.025 to about 2%, and especially from about 0.1% to about 0.05%, by weight of various conventional additives, such as the following, or mixtures thereof.

The following may be mentioned as examples of further additives that can be used in the instant compositions.

Metal deactivators, e.g., oxanilide, isophthalic acid dihydrazide, sebacic acid-bis-phenylhydrazide, bis-benzylideneoxalic acid dihydrazide, N,N'-diacetal-adipic acid dihydrazide, N,N'-bis-salicyloyl-oxalic acid dihydrazide, N,N'-bis-salicyloylhydrazine, N,N'-bis-(3,5-di-tert.-butyl-4-hydroxyphenylpropionyl)-hydrazine, N-salicyloyl-N'-salicylalhydrazine, 3-salicyloyl-amino-1,2, 4-triazole or N,N'-bis-salicyloyl-thiopropionic acid dihydrazide.

Nucleation agents, e.g., 4-tert.-butylhenzoic acid, adipic acid, diphenylacetic acid or substituted sorbitols such as 1,3; 2,4-dibenzylidenesorbitol.

Other additives that can be incorporated in the stabilized compositions are antiblocking agents, clarifiers, antiozonants, lubricants such as stearyl alcohol, fillers, carbon black, asbestos, kaolin, talc, glass fibers, pigments, optical brighteners, flameproofing agents and antistatic agents.

The compositions of the present invention can be prepared by a variety of methods involving intimate admixing of the ingredients with any additional materials desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be precompounded with each other or with a portion of the polymeric resin to make a stabilizer concentrate. Moreover, it is also sometimes advantageous to employ at least one vent port to allow venting (either atmospheric or vacuum) of the melt. Those of ordinary skill in the art will be able to adjust blending times and temperatures, as well as component addition location and sequence, without undue additional experimentation.

While the stabilizers of this invention may be conveniently incorporated by conventional techniques into polymeric resins before the fabrication thereof into shaped articles, it is also possible to apply the instant stabilizers by a topical application to the finished articles. This is particularly useful with fiber applications where the instant stabilizers are applied topically to the fibers, for example, by way of a spin finish during the melt spinning process.

All patents and references cited herein are incorporated by reference herein.

The following examples are presented for the purpose of illustration only and are not to be construed to limit the nature of scope of the instant invention in any manner whatsoever.

EXAMPLES

In a typical process for the practice of the present invention, the test stabilizer was blended/mixed with the resin using Turbula Blender for 30 minutes. The test stabilizer, if liquid, was preblended with a portion of a resin which was then subsequently blended with the resin and mixed well using Turbula Blender. The stabilized resin formulation was extruded at 100 rpm from a 1 inch (2.54 cm) diameter extruder at 500° F. (260° C.) (Killion extruder). The rpm and temperatures may be adjusted according to the resin utilized.

After each of the first, third and fifth extrusions, resin pellets were compression molded 5 into 125 mil (3.2 mm) thick plaques at 370° F. (188° C.) and specimen yellowness index (YI) was determined. Low YI values indicate less yellowing. Additionally, the melt flow rate (in grams/10 minutes) was measured (ASTM-D-1238) on the pellets after the first, third and fifth extrusions. The closer the melt flow rate after the fifth extrusion is to the melt flow rate after the first extrusion indicates the superior process stabilization of the resin.

Molded plaques were subjected to a gas fading procedure whereby the plaques were subjected to fumes from a propane flame in a chamber at 100° C. for the specified time. The yellowness index (YI) of the plaques was then measured. In this test, the closer the number is to zero, the less yellow is the plaque.

To illustrate some of the embodiments of the present invention, the following components were utilized.

| | |
|---|---|
| DSHA | N,N-dioctyldecylhydroxyl amine |
| N(O)(CH$_3$)(C$_{10}$H$_{21}$)$_2$ | didecyl methyl amine oxide |
| N(O)(CH$_3$)(C$_{16-18}$)$_2$ | di(hydrogenated tallow) methyl amine oxide |
| phenol-1 | tetrakis(methylene 3-(3,5-di-tert-butyl-4-hydroxyphenyl)proprionate) methane, a commercially available hindered phenol, available from Ciba-Geigy under the tradename IRGANOX as grade 1010. |
| phenol-2 | 3,5-di-tert-butyl-4-hydroxybenzyl)-s-triazine-2,4,6(1N,3N,5N)trione, a commercially available hindered phenol, available from Ciba-Geigy under the tradename IRGANOX as grade 3114. |
| phosphite-1 | tris(2,4-di-tert-butylphenyl)phosphite, a commercially available phosphite, available from Ciba-Geigy under the tradename IRGAFOS as grade 168. |
| phosphite-2 | bis(2,4-di-tert-butylphenyl)pentaerythritol diphosphite, a commercially available phosphite, available from GE Specialty Chemicals, Inc. under the tradename ULTRANOX as grade 626. |
| phosphite-3 | (2,4,6-tri-tert-butylphenyl)-2-butyl-2-ethyl-1,3-propanediol phosphite, a commercially available phosphite, available from GE Specialty Chemicals, Inc. under the tradename ULTRANOX as grade 641. |
| amine-1 | dimethyl succinate poylmer with 4-hydroxy-2,2,6,6-tetramethyl piperidine ethanol, a commercially available amine, available from Ciba-Geigy under the tradename TINUVIN as grade T-622. |
| amine-2 | (chemical name), a commercially available amine, available from Ciba-Geigy under the tradename CHIMASORB as grade C-119. |
| amine-3 | poly[6-[(1,1,3,3-tetramethylbutyl)amine-s-triazine-2,4-diyl][2,2,6,6-tetramethyl-4-piperidyl-imino]hexamethylene [(2,2,6,6-tetramethyl-4-piperdyl)imino], a commercially available amine, available from Ciba-Geigy under the tradename CHIMASORB as grade C-944. |
| DSTDP | distearylthiodipropionate |
| CaSt | calcium stearate |

In each of the examples in Tables 1 to 6, a commercially available polypropylene resin obtained from Montell as grade Profax 6501 was used. The compositions of Tables 1 to 6 demonstrate the broad utility and advantageous properties that may be obtained for compositions that do contain a tertiary amine oxide in combination with other stabilizers.

TABLE 1

| Sample | 1 | 2 | 3 | 4 | 5 | 6 | 7 |
|---|---|---|---|---|---|---|---|
| phenol-1 | 500 | 0 | 0 | 0 | 0 | 0 | 0 |
| phenol-2 | 0 | 0 | 0 | 0 | 0 | 0 | 0 |
| phosphite-1 | 0 | 500 | 0 | 0 | 0 | 0 | 0 |
| phosphite-2 | 0 | 0 | 500 | 0 | 0 | 0 | 0 |
| phosphite-3 | 0 | 0 | 0 | 500 | 0 | 0 | 0 |
| amine-1 | 0 | 0 | 0 | 0 | 500 | 0 | 0 |
| amine-2 | 0 | 0 | 0 | 0 | 0 | 500 | 0 |
| amine-3 | 0 | 0 | 0 | 0 | 0 | 0 | 500 |
| CaSt | 500 | 500 | 500 | 500 | 500 | 500 | 500 |
| MFR | | | | | | | |
| 1-pass | 10.3 | 8.61 | 5.6 | 6.52 | 20.2 | 13.8 | 17.2 |
| 3-pass | 21.8 | 394 | 10.6 | 27.6 | 63.2 | 60.8 | 61.8 |
| 5-pass | 36.8 | 100+ | 24.3 | 100+ | 100+ | 100+ | 100+ |
| YI | | | | | | | |
| initial | 2.52 | 2.28 | 2.14 | 2.3 | 2.03 | 2.11 | 1.86 |
| 1-pass | 2.71 | 2.68 | 2.82 | 2.82 | 2.09 | 2.29 | 2.34 |
| 3-pass | 4.83 | 3.37 | 3.51 | 2.96 | 2.79 | 2.5 | 2.43 |
| 5-pass | 5.53 | 3.51 | 3.5 | 2.93 | 3.16 | 2.9 | 4.09 |
| gas fading | | | | | | | |
| 0 hours | 2.71 | 2.68 | 2.82 | 2.82 | 2.09 | 2.29 | 2.34 |
| 8 hours | 2.78 | 1.92 | 0.63 | 1.93 | 1.29 | 1.88 | 1.53 |
| 16 hours | 3.9 | 1.11 | 0.53 | 1.14 | 1.00 | 1.41 | 0.71 |

As seen by these data, the melt stability of the compositions not containing a tertiary amine oxide is inadequate as indicated by the large shift in melt flow rate upon multiple extrusion passes. As seen by these data, neither salts of organic acids, phenolic antioxidants, organic phosphorus compounds, or hindered amine stabilizers afford solutions to the melt stability issue.

TABLE 2

| Sample | 8 | 9 | 10 | 11 | 12 | 13 |
|---|---|---|---|---|---|---|
| DSHA | 0 | 0 | 0 | 0 | 500 | 500 |
| phenol-1 | 500 | 500 | 0 | 0 | 0 | 0 |
| phenol-2 | 0 | 0 | 500 | 500 | 0 | 0 |
| phosphite-1 | 500 | 0 | 500 | 0 | 0 | 500 |
| phosphite-2 | 0 | 500 | 0 | 500 | 0 | 0 |
| phosphite-3 | 0 | 0 | 0 | 0 | 0 | 0 |
| amine-1 | 0 | 0 | 0 | 0 | 500 | 0 |
| amine-2 | 0 | 0 | 0 | 0 | 0 | 0 |
| amine-3 | 0 | 0 | 0 | 0 | 0 | 500 |
| CaSt | 500 | 500 | 500 | 500 | 500 | 500 |
| MFR | | | | | | |
| 1-pass | 7.19 | 4.36 | 6.25 | 4.65 | 5.83 | 4.41 |
| 3-pass | 10.8 | 4.98 | 9.26 | 5.16 | 8.94 | 5.88 |
| 5-pass | 16.6 | 6.68 | 14.6 | 6.24 | 13.61 | 8.74 |
| YI | | | | | | |
| initial | 2.44 | 2.37 | 2.26 | 2.35 | 1.79 | 1.91 |
| 1-pass | 3.63 | 2.68 | 2.48 | 2.71 | 2.56 | 2.21 |
| 3-pass | 4.83 | 3.81 | 3.88 | 4.12 | 3.2 | 3.00 |
| 5-pass | 5.71 | 4.58 | 4.64 | 4.79 | 3.66 | 3.43 |
| gas fading | | | | | | |
| 0 hours | 3.63 | 2.68 | 2.48 | 2.74 | — | 2.21 |
| 8 hours | 3.2 | 1.95 | 2.32 | 2.51 | — | 1.84 |
| 16 hours | 4.15 | 2.34 | 2.84 | 2.53 | — | 1.08 |

Compositions 8 to 11 in Table 2 illustrate the properties obtained with a combination of an organic phosphorus compound with a phenolic antioxidant in the presence of an alkaline metal salt of a fatty acid. A can be seen by these illustrative data, a reduction in the shift in melt flow rate upon multiple extrusion passes is obtained in these compositions. Compositions 14 to 16 contain a hydroxylamine compound with other stabilizers and improvements in properties are also obtained.

TABLE 3

| Sample | 14 | 15 | 16 | 17 | 18 | 19 |
|---|---|---|---|---|---|---|
| $N(O)(CH_3)(C_{10}H_{21})_2$ | 0 | 500 | 0 | 500 | 0 | 500 |
| phenol-1 | 0 | 0 | 0 | 0 | 0 | 0 |
| phenol-2 | 0 | 0 | 0 | 0 | 0 | 0 |
| phosphite-1 | 0 | 0 | 0 | 0 | 0 | 0 |
| phosphite-2 | 0 | 0 | 0 | 0 | 0 | 0 |
| phosphite-3 | 0 | 0 | 0 | 0 | 0 | 0 |
| amine-1 | 500 | 500 | 0 | 0 | 0 | 0 |
| amine-2 | 0 | 0 | 500 | 500 | 0 | 0 |
| amine-3 | 0 | 0 | 0 | 0 | 500 | 500 |
| CaSt | 500 | 500 | 500 | 500 | 500 | 500 |
| MFR | | | | | | |
| 1-pass | 17.2 | 4.65 | 13.8 | 4.64 | 20.2 | 5.08 |
| 3-pass | 61.8 | 5.90 | 60.8 | 5.86 | 63.2 | 6.1 |
| 5-pass | 100+ | 8.14 | 100+ | 7.58 | 100+ | 8.26 |
| YI | | | | | | |
| initial | 1.86 | 2.05 | 2.11 | 2.12 | 2.03 | 2.46 |
| 1-pass | 2.34 | 2.31 | 2.29 | 2.67 | 2.09 | 2.68 |
| 3-pass | 2.43 | 2.25 | 2.5 | 3.89 | 2.79 | 3.92 |
| 5-pass | 4.09 | 3.99 | 2.9 | 4.65 | 3.16 | 4.92 |
| gas fading | | | | | | |
| 0 hours | 2.34 | 2.31 | 2.29 | 2.67 | 2.09 | 2.68 |
| 8 hours | 1.53 | 1.95 | 1.88 | 2.52 | 1.29 | 2.62 |
| 16 hours | 0.71 | 1.81 | 1.41 | 3.02 | 1 | 2.83 |

The compositions in Table 3 illustrate the tremendous improvements in properties that are obtained with a combination of a tertiary amine oxide and at least one other stabilizer, for example, a hindered amine stabilizer. As exemplified by comparing the properties of composition 14 not containing a tertiary amine oxide to composition 15 containing a tertiary amine oxide with a hindered amine oxide, very desirable physical properties are obtained. It was unexpected, for example, that such a large improvement in melt stability, as indicated by the retention of the MFR value on multiple extrusions, would be obtained in the compositions containing the tertiary amine oxide.

TABLE 4

| Sample | 20 | 21 | 22 | 23 | 24 | 25 | 26 | 27 |
|---|---|---|---|---|---|---|---|---|
| $N(O)(CH_3)(C_{10}H_{21})_2$ | 0 | 500 | 0 | 500 | 0 | 500 | 0 | 500 |
| phenol-1 | 0 | 0 | 0 | 0 | 0 | 0 | 0 | 0 |
| phenol-2 | 0 | 0 | 0 | 0 | 0 | 0 | 0 | 0 |
| phosphite-1 | 500 | 500 | 500 | 500 | 0 | 0 | 0 | 0 |
| phosphite-2 | 0 | 0 | 0 | 0 | 500 | 500 | 500 | 500 |
| phosphite-3 | 0 | 0 | 0 | 0 | 0 | 0 | 0 | 0 |
| amine-1 | 0 | 0 | 500 | 500 | 0 | 0 | 0 | 0 |
| amine-2 | 0 | 0 | 0 | 0 | 0 | 0 | 500 | 500 |
| amine-3 | 500 | 500 | 0 | 0 | 500 | 500 | 0 | 0 |
| CaSt | 500 | 500 | 500 | 500 | 500 | 500 | 500 | 500 |
| MFR | | | | | | | | |
| 1-pass | 8.61 | 5.25 | 9.37 | 4.34 | 5.99 | 4.03 | 5.63 | 3.97 |
| 3-pass | 39.40 | 6.12 | 40.8 | 5.39 | 1.4 | 4.89 | 12.4 | 4.72 |
| 5-pass | 100+ | 7.68 | 100+ | 6.82 | 56.4 | 5.98 | 41.9 | 6.12 |
| YI | | | | | | | | |
| initial | 2.28 | 1.76 | 2.26 | 2.26 | 2.18 | 2.24 | 2.26 | 2.39 |
| 1-pass | 2.68 | 1.90 | 2.76 | 2.57 | 2.53 | 2.67 | 2.7 | 2.71 |
| 3-pass | 3.37 | 3.40 | 3.3 | 3.14 | 3.27 | 3.64 | 3.34 | 3.58 |
| 5-pass | 3.51 | 3.90 | 3.34 | 3.86 | 3.44 | 4.18 | 3.42 | 4.21 |

The compositions in Table 4 further illustrate the tremendous improvements in properties that are obtained with a combination of a tertiary amine oxide and at least one other stabilizer, for example, an organic phosphorus compound. As exemplified by comparing the properties of composition 20 not containing a tertiary amine oxide to composition 21 containing a tertiary amine oxide with an organic phosphorus compound, very desirable physical properties are obtained. It was unexpected that the tertiary amine oxide would afford the magnitude of improvements noted by these data.

TABLE 5

| Sample | 28 | 29 | 30 | 31 | 32 | 33 |
|---|---|---|---|---|---|---|
| $N(O)(CH_3)(C_{10}H_{21})_2$ | 0 | 500 | 0 | 500 | 0 | 500 |
| phenol-1 | 0 | 0 | 0 | 0 | 0 | 0 |
| phenol-2 | 0 | 0 | 0 | 0 | 0 | 0 |
| phosphite-1 | 0 | 0 | 0 | 0 | 0 | 0 |
| phosphite-2 | 0 | 0 | 0 | 0 | 0 | 0 |
| phosphite-3 | 500 | 500 | 500 | 500 | 500 | 500 |
| amine-1 | 0 | 0 | 0 | 0 | 500 | 500 |
| amine-2 | 0 | 0 | 500 | 500 | 0 | 0 |
| amine-3 | 500 | 500 | 0 | 0 | 0 | 0 |
| CaSt | 500 | 500 | 500 | 500 | 500 | 500 |
| MFR | | | | | | |
| 1-pass | 6.72 | 3.99 | 6.71 | 3.82 | 6.4 | 3.9 |
| 3-pass | 27.4 | 5.08 | 37.5 | 4.86 | 30.8 | 5.06 |
| 5-pass | 100+ | 6.34 | 100+ | 6.18 | 100+ | 6.18 |
| YI | | | | | | |
| initial | 2.13 | 2.37 | 3.18 | 2.47 | 2.24 | 2.22 |
| 1-pass | 2.78 | 2.77 | 2.83 | 2.73 | 3.03 | 2.38 |
| 3-pass | 2.92 | 3.58 | 2.96 | 3.44 | 2.88 | 3.16 |
| 5-pass | 2.97 | 3.85 | 3.29 | 3.71 | 2.98 | 3.74 |

The compositions in Table 5 further illustrate the tremendous improvements in properties that are obtained with a combination of a tertiary amine oxide and a combination of stabilizers, for example, an organic phosphorus compound and a hindered amine stabilizer. As exemplified by comparing the properties of composition 28 not containing a tertiary amine oxide to composition 29 containing a tertiary amine oxide with an organic phosphorus compound and a hindered amine stabilizer, very desirable physical properties are obtained with the addition of the tertiary amine oxide.

TABLE 6

| Sample | 34 | 35 | 36 | 37 | 38 | 39 |
|---|---|---|---|---|---|---|
| $N(O)(CH_3)(C_{16-18})_2$ | 500 | 500 | 500 | 500 | 500 | 500 |
| phenol-1 | 0 | 0 | 0 | 0 | 0 | 0 |
| phenol-2 | 0 | 0 | 0 | 0 | 0 | 0 |
| phosphite-1 | 0 | 0 | 0 | 0 | 0 | 0 |
| phosphite-2 | 0 | 0 | 0 | 0 | 0 | 0 |
| phosphite-3 | 0 | 500 | 500 | 500 | 500 | 0 |
| amine-1 | 500 | 0 | 0 | 0 | 500 | 0 |
| amine-2 | 0 | 0 | 0 | 500 | 0 | 0 |
| amine-3 | 0 | 0 | 500 | 0 | 0 | 0 |
| DSTDP | 0 | 0 | 0 | 0 | 0 | 500 |
| CaSt | 500 | 500 | 500 | 500 | 500 | 500 |
| MFR | | | | | | |
| 1-pass | 5.04 | 4.34 | 4.11 | 4.05 | 4.18 | 4.03 |
| 3-pass | 6.72 | 5.14 | 5.46 | 5.36 | 6.14 | 4.53 |
| 4-pass | 8.87 | 6.32 | 7.22 | 7.6 | 7.04 | 5.44 |
| YI | | | | | | |
| initial | 2.1 | 1.99 | 2.25 | 2.44 | 2.11 | 1.99 |
| 1-pass | 1.68 | 2.4 | 2.77 | 2.71 | 2.41 | 2.26 |
| 3-pass | 2.66 | 3.19 | 3.37 | 3.15 | 2.97 | 2.73 |
| 5-pass | 3.4 | 3.76 | 3.69 | 3.63 | 3.46 | 3.11 |

The compositions in Table 6 further illustrate the tremendous improvements in properties that are obtained with a combination of a tertiary amine oxide, in these examples $N(O)(CH_3)(C_{16-18})_2$, and a combination of stabilizers, for example, an organic phosphorus compound and a hindered amine stabilizer. These compositions further demonstrate the unexpected improvement in melt stability with the addition of the tertiary amine oxide.

What is claimed:

1. A stabilized resin composition comprising:
   (a) a thermoplastic resin or mixture thereof,
   (b) a stabilizing amount of a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydroxylamines, and the thiosynergists, and
   (c) a stabilizing amount of a tertiary amine oxide selected from the group consisting of dioctyl methyl amine oxide, trioctyl amine oxide, didecyl methyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri($C_{20}$–$C_{22}$) amine oxide, di($C_{20}$–$C_{22}$ alkyl) methyl amine oxide, and mixtures containing any of the foregoing.

2. The composition of claim 1, wherein the tertiary amine oxide further contains at least one —O—, —S—, —SO—, —$CO_2$—, —CO—, or —CON— moiety.

3. The composition of claim 1, wherein the thermoplastic resin is a polyolefin resin.

4. The composition of claim 3, wherein said composition comprises an alkaline metal salt of a fatty acid.

5. The composition of claim 1, wherein said stabilizer or mixture of stabilizers is a stabilizing amount of a phenolic antioxidant or mixture thereof in combination with a stabilizing amount of:
   a) an organic phosphorus compound or mixture thereof; or
   b) a hindered amine stabilizer or mixture thereof; or
   c) a thiosynergist or mixture thereof; or
   d) an ultraviolet light absorber or mixture thereof; or
   e) a hindered amine stabilizer and an organic phosphorus compound or mixtures thereof; or
   f) a hindered amine stabilizer, a thiosynergist and an organic phosphorus compound or mixtures thereof; or
   g) an ultraviolet light absorber and a hindered amine stabilizer or mixtures thereof; or
   h) an ultraviolet light absorber and an organic phosphorus compound or mixtures thereof; or
   i) an alkaline metal salt of a fatty acid or mixture thereof; or
   j) a hydroxyl amine or mixture thereof.

6. The composition of claim 1, wherein said stabilizer or mixture of stabilizers comprises a stabilizing amount of a phenolic antioxidant or mixture thereof.

7. The composition of claim 1, wherein said stabilizer or mixture of stabilizers comprises a stabilizing amount of a hindered amine stabilizer or mixture thereof.

8. The composition of claim 1, wherein said stabilizer or mixture of stabilizers comprises a stabilizing amount of an alkaline metal salt of a fatty acid or mixture thereof.

9. The composition of claim 1, wherein said stabilizer or mixture of stabilizers comprises a stabilizing amount of a 3-arylbenzofuranone.

10. The composition of claim 1, wherein said organic phosphorus compound is selected from the group consisting of tris(2,4-di-tert-butylphenyl) phosphite, 3,9-di(2,4-di-tert-butylphenoxy)-2,4,8,10-tetraoxa-3,9-diphospha[5.5] undecane, tris(p-nonylphenyl) phosphite, 3,9-distearyloxy-2,4,8,10-tetraoxa-3,9-diphospha[5.5]undecane, dilauryl phosphite, 3,9-di[2,6-di-tert-butyl-4-(2-(n-octadecyloxycarbonyl)ethyl)-phenoxy]-2,-4,8,10-tetraoxa-3,9-diphospha[5.5]undecane and tetrakis(2,-di-tert-butylphenyl) 4,4'-bis(diphenylene)phosphonite, distearyl pentaerythritol diphosphite, diisodecyl pentaerythritol diphosphite, 2,4,6-tri-tert-butylphenyl-2-butyl-2-ethyl-1,3-propanediol phosphite, bis(2,4-di-tert-butylphenyl) pentaerythritol diphosphite, tristearyl sorbitol triphosphite, tetrakis(2,4-di-tert-butylphenyl)4,4'-biphenylene diphosphonite, and mixtures of phosphites containing at least one of the foregoing.

11. The composition of claim 1, wherein said phenolic antioxidant is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-methyl-2,4-6-tris(3, 5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl4-tert-butyl-3-hydroxybenzyl)isocyanurate, 1,1,3-tris (2-methyl-4-hydroxy-5-tert-butylphenyl)butane, 1,3,5-tris[2-(3,5-di-tert-butyl-4-hydroxyhydrocinnamoyloxy)-ethyl]-isocyanurate, 3,5-di-(3,5-di-tert-butyl-4-hydroxybenzyl)-mesitol, hexamethylene bis(3,5-di-tert-butyl-4-hydroxyhydrocinnamate), 1-(3,5-di-tert-butyl-4-hydroxyanilino)-3,-5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis [2-(3,5di-tert-butyl-4-hydroxyhydroxocinnamoyloxy)ethyl] oxamide.

12. The composition of claim 11, wherein said phenolic antioxidant is selected from the group consisting of neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris-(3,5-di-tert-butyl-4-hydroxybenzyl)isocyanurate, 2,6-di-tert-butyl-p-cresol and 2,2'-ethylidene-bis(4,6-di-tert-butylphenol).

13. The composition of claim 1, wherein said hydroxylamine is selected from the group consisting of N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dioctylhydroxylamine, N,N-di-tert-butylhydroxylamine, N-cyclohexylhydroxylamine, N-cyclododecylhydroxylamine, N,N-dicyclohexylhydroxylamine, N,N-dibenzylhydroxylamine, N,N-didecylhydroxylamine, N,N-di(coco alkyl)hydroxylamine, N,N-di(tallow alkyl)hydroxylamine, N,N-di($C_{20}$–$C_{22}$ alkyl) hydroxylamine, and mixtures containing any of the foregoing.

14. The composition of claim 1, wherein said thermoplastic resin is selected from the group consisting of polypropylene, low density polyethylene, medium density polyethylene, high density polyethylene, linear low density polyethylene, poly(butene-1), ethylene/vinyl acetate copolymer, ethylene/propylene copolymer, and copolymers of ethylene or of propylene with other alpha-olefins.

15. The composition of claim 1, wherein said thiosynergist is selected from the group consisting of dilauryl thiodipropionate, distearyl thiodiproprionate and neopentanetetrayl tetrakis(3-dodecylthiopropionate).

16. The composition of claim 1, wherein said hindered amine stabilizer is selected from the group consisting of bis(2,2,6,6-tetramethylpiperidin-4-yl) sebacate, bis(1,2,2,6, 6-pentamethylpiperidin4-yl) sebacate, di(1,2,2,6,6-pentamethylpiperidin-4-yl) (3,5-di-tert-butyl-4-hydroxybenzyl)-butylmalonate, tris-(2,2,6,6-tetramethylpiperidin4-yl) nitrilotriacetate, 1,2-bis(2,2,6,6-tetramethyl-3-oxopiperazin4-yl)ethane, 2,2,4,4-tetramethyl-7-oxa-3,20-diaza-21-oxodispiro- [5.1.11.2]-heneicosane, polycondensation product of 2,4-dichloro-6-tert-octylamino-s-triazine and 4,4'-hexamethylenebis(amino-2, 2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylene-bis(amino-2,2,-6,6-tetramethylpiperidine) and 1,2-dibromoethane, polycondensation product of 2,4-dichloro-6-moropholino-s-triazine and 4,4'-hexamethylenebis(amino-2,2,6,6-tetramethylpiperidine) N,N',N'',N'''-tetrakis[(4,6-bis(butyl-(2,2,6,6-tetramethylpiperidin-4-yl)amino)-s-triazine-2-yl]-1,10-diamino-4,7-diazadecane, octamethylene bis(2,2,6,6-tetramethylpiperidin-4-carboxylate), 4,4'-ethylenebis(2,2, 6,-6-tetramethylpiperazine-3-one), and mixtures thereof.

17. A stabilized resin composition consisting essentially of:

(a) a thermoplastic resin or mixture thereof, (b) a stabilizing amount of a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydroxylamines, and the thiosynergists, and (c) a stabilizing amount of a tertiary amine oxide selected from the group consisting of dioctyl methyl amine oxide, trioctyl amine oxide, didecyl methyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri($C_{20}$–$C_{22}$) amine oxide, di($C_{20}$–$C_{22}$ alkyl) methyl amine oxide, and mixtures containing any of the foregoing.

18. A stabilized resin composition comprising:

(a) a thermoplastic resin or mixture thereof, (b) a stabilizing amount of a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydroxylamines, and the thiosynergists, and (c) a stabilizing amount of a thermal reaction product of a tertiary amine oxide selected from the group consisting of dioctyl methyl amine oxide, trioctyl amine oxide, didecyl methyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri($C_{20}$–$C_{22}$) amine oxide, di($C_{20}$–$C_{22}$ alkyl) methyl amine oxide, and mixtures containing any of the foregoing.

19. The composition of claim 18, wherein the tertiary amine oxide further contains at least one —O—, —S—, —SO—, —$CO_2$—, —CO—, or —CON— moiety.

* * * * *